Oct. 23, 1945.    J. KÜFFER    2,387,592

FILM SCANNING DEVICE

Filed June 20, 1939

Inventor:
Johannes Küffer

Patented Oct. 23, 1945

2,387,592

UNITED STATES PATENT OFFICE 2,387,592

FILM SCANNING DEVICE

Johannes Küffer, Berlin, Germany; vested in the Alien Property Custodian

Application June 20, 1939, Serial No. 280,094
In Germany June 27, 1938

2 Claims. (Cl. 178—7.6)

In the art of television all mechanic means for scanning a film scan an area the geometric form of which does not coincide with that of the film image.

If, in the simplest case, a scanning drum is used the image of its cylindric surface projected by a lens on the plane of the film is also cylindric and therefore not sharp on its entire extension. The same fault arises in the case of a mirror drum and of other similar means used for scanning. It makes, of course, no difference whether the apertures of the scanner are lighted and projected on the film or vice versa.

Another case is that of a Nipkow disc. The scanned area is a trapezium and the scanned lines are arcs. This "keystone distortion" is particularly noxious for interlaced scanning, as well known.

It is the object of the invention to avoid the described optic faults in a simple manner by imparting to the film, when passing the film gate, a slightly crooked cross-section.

The invention is illustrated in the accompanying drawing in which

Figure 1:
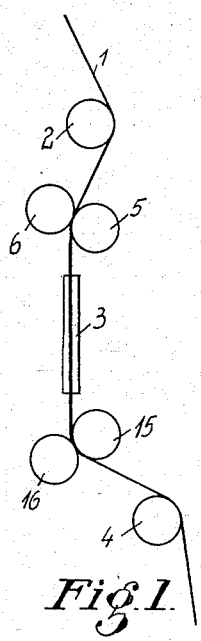
Figure 2:
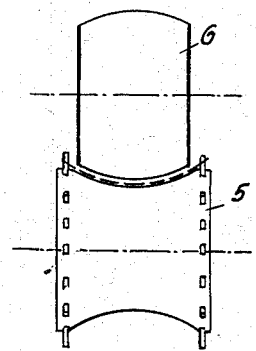
Figure 3:
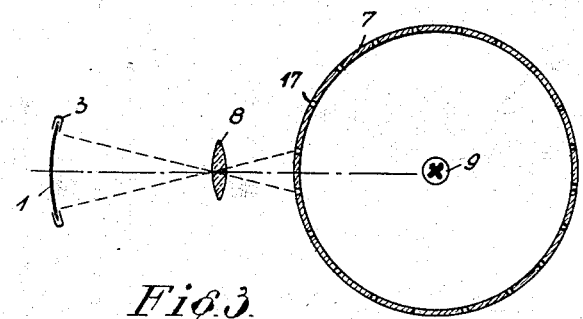
Figures 4, 5, 6, 7, 8, 9:
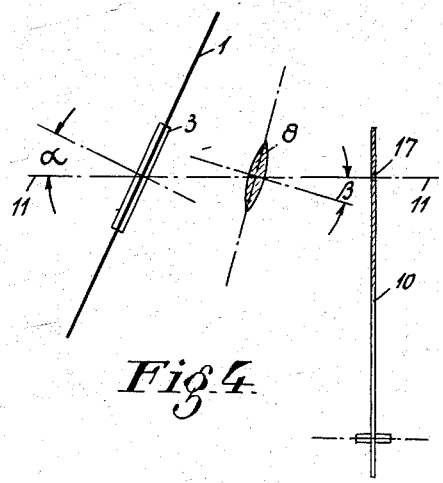

Fig. 1 is a side view of the general arrangement of the film gate and the guiding rollers, Fig. 2 shows the said rollers, Fig. 3 is a cross-section through a scanning arrangement using an apertured drum, Fig. 4 shows the application of the invention in the case of a Nipkow disc, and Figs. 5-9 serve for explaining the effect of this arrangement.

In Fig. 1 1 is the film which is conducted by the rollers 2, 5—6, 15—16 and 4 through the film gate 3. As shown by Fig. 2, the rollers 5—6, and also the rollers 15—16, are so shaped as to impart to the film a slightly crooked cross-section, and the form of the film gate 3 (see Fig. 3) is also adapted to keep the film in the same crooked condition.

Fig. 3 shows the effect of the described measure in the case of a scanning drum 7 having apertures 17 which may be lighted by a light source 9. The surface of the drum is projected by a lens 8 on the film gate 3. The projected image is, as well known, also cylindrically curved at a radius which depends on the scale of the projection. According to the invention the film 1 is crooked at a radius equal to that of the projected image so that the optic failure is avoided.

When the scanning is perfected by means of a Nipkow disc 10 (Fig. 4) the film gate 3, according to the invention, has to be arranged inclined at an angle α to the optical axis 11—11 and the projecting lens 8 at an angle β which is practically equal to α/2. The film 1 is crooked as described above. The effect of this arrangement will be described on hand of Figs. 5 to 9.

Fig. 5 shows a flat film 1 (cross-section Fig. 6) carrying rectangular images. If now the same film is crooked (Fig. 9) and inclined at an angle α (Fig. 7) and observed in the direction of the arrow 12, it looks as shown by Fig. 8. The horizontal edges 13 of the images appear now curved. By properly choosing the crookedness of the film and the angle α it is easily to obtain that the curvature of the lines 13 is equal to the curvature of the scanning track of an aperture 17 projected on the film. At the same time, by the inclination α of the film, the keystone effect is completely compensated.

If the scanning drum or disc is provided, instead with simple apertures, with lenses, the proportions described above have to be adapted in an obvious manner.

I claim:

1. A film scanning device comprising a film gate, a scanning disc having a spiral of apertures, a light source for illuminating said apertures and a lens system for projecting subsequently the light penetrating said apertures upon said film gate, said film gate being adapted for keeping the passing part of the film slightly crooked across its length and being inclined to said film gate, the angle of said inclination being so chosen as to compensate the errors of reproduction caused by the curvature of said disc and by the keystone distortion.

2. A film scanning device comprising a film gate, a scanning disc having a spiral of apertures, each being closed by a small lens, a light source for illuminating said apertures and a lens system for projecting subsequently the light penetrating said apertures upon said film gate, said film gate being adapted for keeping the passing part of the film slightly crooked across its length and being inclined to said film gate, the angle of said inclination being so chosen as to compensate the errors of reproduction caused by the curvature of said disc and by the keystone distortion.

JOHANNES KÜFFER.